United States Patent
Conner et al.

(10) Patent No.: US 9,406,235 B2
(45) Date of Patent: Aug. 2, 2016

(54) RUNWAY LOCATION DETERMINATION

(71) Applicant: Honeywell International Inc., Morristown, NJ (US)

(72) Inventors: Kevin J Conner, Kent, WA (US); Christine Marie Haissig, Chanhassen, MN (US); Ruy C. Brandao, Redmond, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/250,022

(22) Filed: Apr. 10, 2014

(65) Prior Publication Data

US 2015/0294573 A1    Oct. 15, 2015

(51) Int. Cl.
| | |
|---|---|
| *G01C 21/00* | (2006.01) |
| *G08G 5/00* | (2006.01) |
| *G01C 21/30* | (2006.01) |
| *G08G 5/06* | (2006.01) |

(52) U.S. Cl.
CPC .............. *G08G 5/0017* (2013.01); *G01C 21/00* (2013.01); *G01C 21/30* (2013.01); *G08G 5/0013* (2013.01); *G08G 5/0082* (2013.01); *G08G 5/065* (2013.01)

(58) Field of Classification Search
CPC ... G08G 5/045; G08G 5/0017; G08G 5/0065; G08G 5/025; G01C 21/165; G01C 21/00
USPC ............. 701/3, 14, 16, 9, 120, 301, 408, 532; 340/972, 945, 961
See application file for complete search history.

(56) References Cited

U.S. PATENT DOCUMENTS

| | | | |
|---|---|---|---|
| 5,483,241 A | 1/1996 | Waineo et al. | |
| 5,703,774 A * | 12/1997 | Houck et al. | 701/14 |
| 5,714,948 A * | 2/1998 | Farmakis et al. | 340/961 |
| 6,381,541 B1 | 4/2002 | Sadler | |
| 6,674,434 B1 | 1/2004 | Chojnacki et al. | |
| 6,690,296 B2 | 2/2004 | Corwin et al. | |
| 6,862,519 B2 | 3/2005 | Walter | |
| 7,117,089 B2 * | 10/2006 | Khatwa et al. | 701/301 |
| 7,342,514 B1 | 3/2008 | Bailey et al. | |

(Continued)

FOREIGN PATENT DOCUMENTS

| | | |
|---|---|---|
| CN | 102636796 A | 8/2012 |
| EP | 1098168 A2 | 5/2001 |
| WO | 03107299 A2 | 12/2003 |

OTHER PUBLICATIONS

Extended Search Report from counterpart European Application No. 15160911.2, dated Oct. 12, 2015, 8 pp.

(Continued)

*Primary Examiner* — Gertrude Arthur Jeanglaud
(74) *Attorney, Agent, or Firm* — Shumaker & Sieffert, P.A.

(57) ABSTRACT

In some examples described herein, a runway location is determined based on aircraft state information from at least one aircraft. For example, a processor may determine the coordinates of one or more points of a runway based on aircraft state information generated by one or more aircraft using the runway. In some examples, the processor may aggregate coordinates determined from the aircraft state information provided by a plurality of different aircraft in order to determine the location of the runway. The processor can be located onboard an aircraft providing the state information, onboard a different aircraft, or external to any aircraft.

49 Claims, 3 Drawing Sheets

(56) References Cited

U.S. PATENT DOCUMENTS

| | | |
|---|---|---|
| 7,586,422 B2 | 9/2009 | Goodman et al. |
| 7,587,278 B2 | 9/2009 | Poe et al. |
| 7,626,513 B2 | 12/2009 | Goodman et al. |
| 7,647,179 B2 | 1/2010 | Goldstein |
| 8,116,989 B2* | 2/2012 | Journade et al. ............... 702/34 |
| 8,145,367 B2 | 3/2012 | Khatwa et al. |
| 8,224,507 B2 | 7/2012 | Edwards et al. |
| 8,774,989 B1* | 7/2014 | Bush et al. ..................... 701/14 |
| 2004/0046687 A1* | 3/2004 | LaFrey et al. ................. 342/33 |
| 2006/0066459 A1* | 3/2006 | Burch et al. ................. 340/980 |
| 2008/0106438 A1* | 5/2008 | Clark et al. .................. 340/972 |
| 2009/0265090 A1* | 10/2009 | Poe et al. ..................... 701/120 |
| 2011/0071756 A1 | 3/2011 | Stahlin |
| 2011/0130948 A1* | 6/2011 | Oh et al. ...................... 701/120 |
| 2012/0078495 A1 | 3/2012 | Hamblin et al. |

OTHER PUBLICATIONS

Response to Communication pursuant to Rules 70(2) and 70a(2) EPC dated Nov. 16, 2015, from counterpart European Application No. EP151609112, filed Apr. 4, 2016, 18 pp.

* cited by examiner

RUNWAY LOCATION DETERMINATION

TECHNICAL FIELD

This disclosure relates to determining a location of a runway.

BACKGROUND

Information about a runway location may be useful for various purposes. For example, knowledge of a runway location may help prevent a collision on the runway, which may occur when an aircraft or other vehicle enters a runway that is already occupied.

SUMMARY

The disclosure describes devices, systems, and techniques for determining a runway location based on state information from at least one aircraft. In some examples, a processor determines the coordinates of one or more points of a runway based on aircraft state information provided by one or more aircraft using the runway. In some examples, the processor may aggregate coordinates determined from the position information provided by a plurality of different aircraft in order to determine the location of the runway. The processor can be located onboard an aircraft providing the state information, onboard a different aircraft, or external to any aircraft.

In one aspect, the disclosure is directed to a method that comprises receiving, by a processor, aircraft state information from at least one aircraft, and determining, by the processor, a location of a runway based on the received aircraft state information.

In another aspect, the disclosure is directed to a system comprising a memory, and a processor configured to receive, via the communication module, aircraft state information from at least one aircraft, determine a location of a runway based on the received aircraft state information, and store the determined location in the memory.

In another aspect, the disclosure is directed to a system comprising means for receiving aircraft state information from at least one aircraft, and means for determining a location of a runway based on the received aircraft state information.

In another aspect, the disclosure is directed to an article of manufacture comprising a computer-readable storage medium. The computer-readable storage medium comprises computer-readable instructions that are executed by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein. The computer-readable medium is non-transitory computer-readable storage medium in some examples.

The details of one or more examples are set forth in the accompanying drawings and the description below. Other features, objects, and advantages will be apparent from the description and drawings, and from the claims.

DETAILED DESCRIPTION

In examples described herein, a location of a runway is determined based on state information from one or more aircraft using the runway. The location of the runway can include, for example, the coordinates of one or more points of the runway. The coordinates may be absolute coordinates or relative coordinates. The aircraft state information provided by an aircraft may include aircraft position information, which can be, for example, geographic coordinates of the aircraft (e.g., latitude, longitude, and elevation) or relative coordinates of the aircraft (e.g., a three-dimensional position relative to a known reference point). In addition, in some examples, the aircraft state information includes one or more of velocity (speed and track) of the aircraft, aircraft type, and an indication that the aircraft has landed, if available.

In some examples, a processor may interpolate between two or more of the determined points of the runway, extrapolate from one or more points, or other estimation techniques or combination of estimation techniques, to develop a reasonably accurate location for the runway. For example, the processor may determine that the runway extends between two of the determined points, extends out a certain distance from one of the determined points, or both. In this way, the determined runway location may also be referred to as a derived runway location. In some examples, the determined runway location may be stored in a memory that stores location information for a plurality of different runways at the same airport or at different airports.

Figure 1:
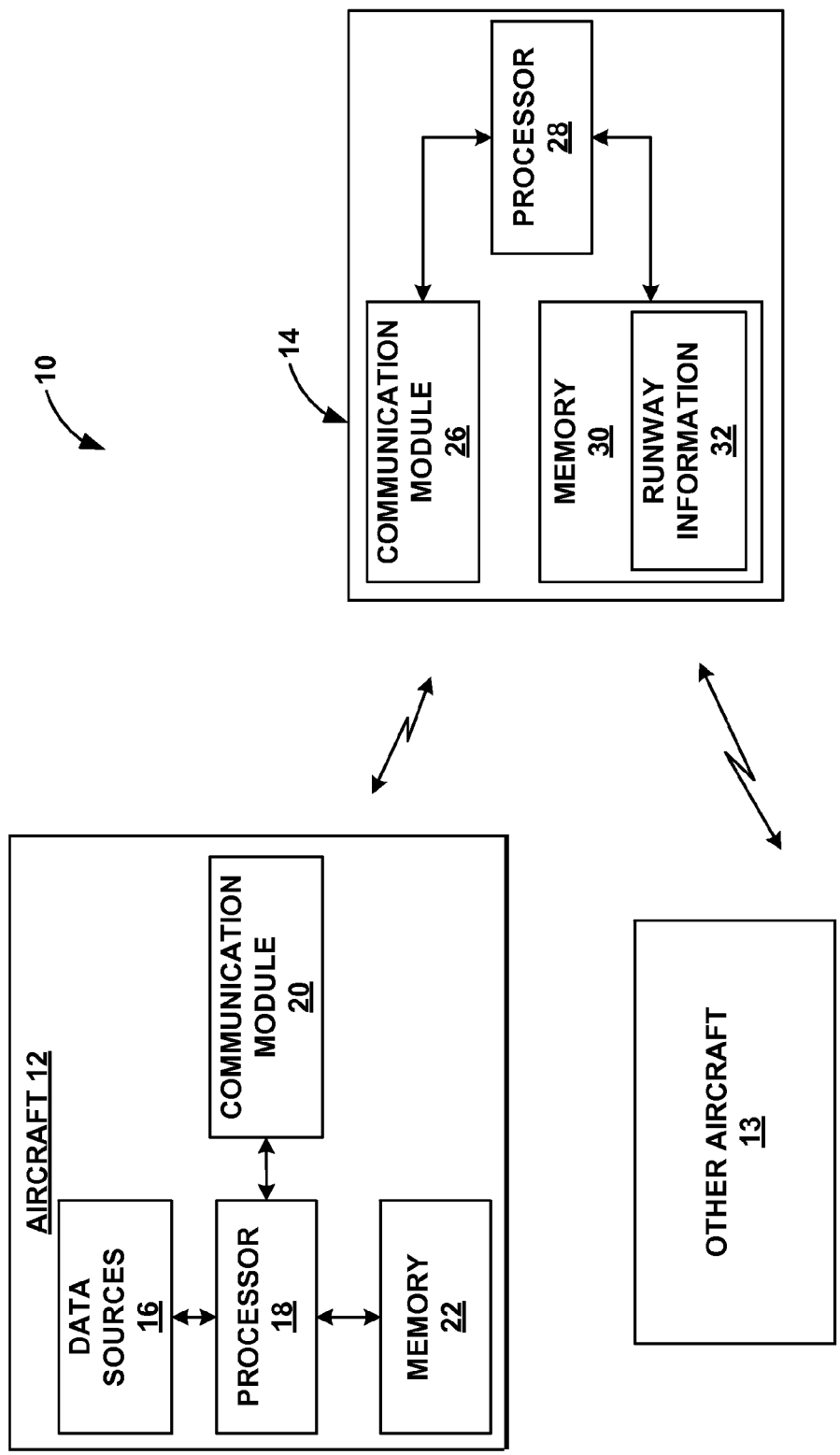
FIG. 1 is a block diagram illustrating an example system including a runway locating device configured to determine a runway location based on aircraft state information from at least one aircraft using the runway.

FIG. 1 is a functional block diagram illustrating an example system 10 for determining a location of a runway based on state information provided by one or more aircraft using the runway. System 10 includes aircraft 12, one or more other aircraft 13, and runway locating device 14. Runway locating device 14 may be located onboard aircraft 12 or may be located external to any aircraft, such as at a ground structure, on a ground vehicle, or at another remote location relative to aircraft 12.

In the example shown in FIG. 1, aircraft 12 includes data sources 16, a processor 18, a communication module 20, and a memory 22. Data sources 16 include one or more informational systems, which may reside onboard aircraft 12 or at a remote location. For example, data sources 16 may include one or more of an inertial reference system, a navigational database, and a flight management system. Data sources 16 can include mode, position, and/or detection elements (e.g., gyroscopes, global positioning systems, and/or avionics sensors) capable of generating state information for aircraft 12, including position information. The position information indicates the present position (e.g., geographic coordinates or relative coordinates) of aircraft 12 at the time the position information was generated. Although not shown in FIG. 1, aircraft 13 can also include data sources like those of aircraft 12.

Processor 18, as well as other processors disclosed herein, can comprise any suitable arrangement of hardware, software, firmware, or any combination thereof, to perform the techniques attributed to processor 18 herein. For example, processor 18 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 22 includes any volatile or non-volatile media, such as a RAM, ROM, non-volatile RAM (NVRAM), electrically erasable programmable ROM (EEPROM), flash memory, and the like. Memory 22 may store computer readable instructions that, when executed by processor 18 cause processor 18 to implement the techniques attributed to processor 18 herein.

Processor 18 is configured to receive data from, and, in some cases, control, one or more data sources 16 of aircraft 12. Processor 18 is also configured to send and receive information over a data channel via communications module 20, which may include a transponder. For example, with the aid of communications module 20, processor 18 may be configured to transmit aircraft state information generated by one or more data sources 16 to runway locating device 14; transmit aircraft state information generated by one or more data sources 16 to one or more other aircraft 13; receive aircraft state information from one or more other aircraft 13; receive runway location information from and/or transmit runway location information to one or more other aircraft 13 and/or runway locating device 14; or any combination thereof.

In some examples, communication module 20 includes an Automatic Dependent Surveillance Broadcast system (ADS-B) system. The ADS-B system is configured to automatically and periodically broadcast aircraft state information. In addition to, or instead of the ADS-B system, communication module 20 can transmit the aircraft state information for aircraft 12, receive aircraft state information from other aircraft 12, or both, using another communication scheme, such as the Worldwide Interoperability for Microwave Access (WiMAX) standard.

In the example shown in FIG. 1, runway locating device 14 includes communication module 26, processor 28, and memory 30, which stores runway information 32. Processor 28 and memory 30 can be similar to processor 18 and memory 20 of each aircraft 12. Memory 30 may store computer readable instructions that, when executed by processor 28 cause processor 28 to implement the techniques attributed to processor 18 herein. In examples in which device 14 is located onboard aircraft 12, communications module 26, processor 28, and memory 30 can be resources shared by aircraft 12. As an example, communications module 26, processor 28, memory 30 may be provided by communication module 20, processor 18, and memory 22, respectively, of aircraft 12.

Processor 28 is configured to determine a runway location based on aircraft state information received via communications module 26 from aircraft 12 that is using the runway and, in some examples, from one or more other aircraft 13 that are using the runway at a different time. In examples in which device 14 is onboard aircraft 12, processor 28 receives aircraft state information from internal data sources 16. This may be referred to as ownship state information. In these examples, processor 28 determines a runway location based on ownship state information generated as aircraft 12 lands or takes off on the runway.

In examples in which device 14 is located external to aircraft 12, processor 28 is configured to receive aircraft state information from aircraft 12 via communications module 26, which may include any suitable transponder. In either example, processor 28 can also be configured to receive aircraft state information from one or more other aircraft 13 via communications module 26. For example, communications module 26 can be configured to receive ADS-B transmissions from one or more other aircraft 13. In some examples, processor 28 requests the state information from one or more aircraft 12, 13, while in other examples, the aircraft may transmit the aircraft state information on their own initiative. In the case of ADS-B transmissions, for example, the aircraft may transmit the position information once every second, although other frequencies of transmission can also be used.

In the example shown in FIG. 1, processor 28 stores runway locations determined based on aircraft state information from at least one aircraft in memory 30 as runway information 32. In some examples, a runway location stored by memory 30 includes sets of coordinates, each set of coordinates being associated with a respective location point of the runway. For example, the location of a runway may be stored as a first set of coordinates that indicates an estimated beginning point of the runway (a point near a first end of the runway) and a second set of coordinates that indicate an estimated end point (a point near a second end) of the runway. As discussed in further detail below, for a particular runway, processor 28 may estimate the locations of the beginning and end points based on aircraft state information broadcast by one or more aircraft 12, 13 using the runway. Because runways are typically substantially straight (e.g., straight or nearly straight), the coordinates for the estimated beginning point and the estimated end point of the runway may be sufficient to identify the approximate location of the runway. Processor 28 may determine, for example, that a centerline (which can be approximated) of the runway extends along the length of the runway in a substantially straight line (i.e., straight or nearly straight) between the stored end points, and that the runway has a predetermined width that is centered at the centerline. The true centerline may be equidistant from either side of the runway. For ease of description, the direction parallel to the centerline is referred to as a longitudinal direction and the direction orthogonal to the centerline is referred to as a lateral direction.

The runway information 32 stored by memory 30 may be useful for multiple aircraft systems that improve safety and reduce the likelihood of collisions with other aircraft on the runway. For example, the stored runway locations can be part of a display to the pilot of aircraft 12 that includes the location of other aircraft to provide situational awareness when approaching the airport for landing or navigating aircraft 12 in the ground. As another example, an alerting system of aircraft 12 may reference the stored runway locations and the location of other aircraft to determine whether aircraft 12 is on or near e.g., within a threshold distance of) a runway that is already occupied and generate an alert in response to determining aircraft 12 is on or near the runway. An example of such an alerting system and technique is described in U.S. Pat. No. 8,145,367 to Khatwa et al., which issued on Mar. 27, 2012 and entitled, "CLOSED AIRPORT SURFACE ALERTING SYSTEM." The entire content of U.S. Pat. No. 8,145, 367 to Khatwa et al. is incorporated by reference. Other avionics systems can also be used in conjunction with the runway locating systems and techniques described herein.

Some aircraft include a runway database that stores runway layout information for one or more airports. Purchasing, deploying, and updating these runway databases into aircraft may be burdensome. In addition, runway layouts may not be available for all airports. Runway locating device 14 may determine runway information that may not otherwise be available from runway databases. Runway locating device 14 is configured to determine a location for a runway based on position information from one or more aircraft that are presently using the runway or have recently used the runway.

Figure 2:
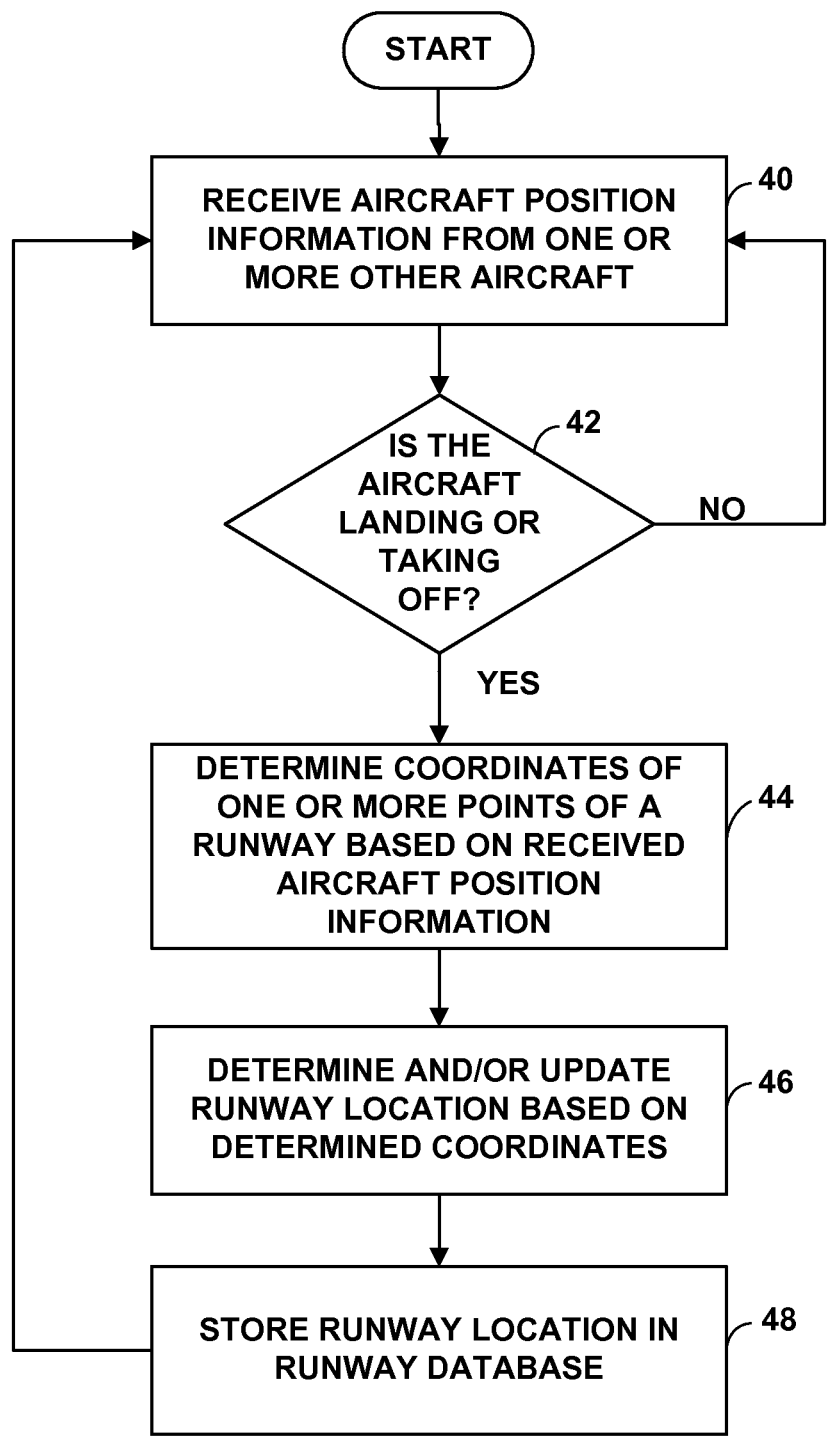
FIG. 2 is a flow diagram illustrating an example technique for determining a runway location based on aircraft state information from at least one aircraft.

FIG. 2 is a flow diagram of an example technique for determining the location of a runway based on aircraft state information generated and transmitted by one or more aircraft. In examples in which device 14 is located onboard aircraft 12, processor 28 may implement the technique shown in FIG. 2 at any suitable time, such as when aircraft 12 is on the ground at an airport or landing at the airport.

In accordance with the technique shown in FIG. 2, processor 28 receives, via communications module 26, aircraft state information from one or more aircraft (40). For example, communications module 26 may receive ADS-B transmissions by aircraft within a broadcast range of device 14 and transmit the received information to processor 28. For ease of description, in the example shown in FIG. 2, aircraft 12 is considered to be providing the aircraft state information.

Processor 28 determines, based on the received aircraft state information, if aircraft 12 is landing or taking off (42). An aircraft may be considered to be landing when the aircraft is approaching the runway to land (prior to touchdown), is decelerating on the runway after touching down on the runway, is taxiing on the runway after landing, or is otherwise on a runway after touching down. An aircraft may be considered to be taking off when the aircraft is physically located on the runway on which the aircraft is intending on taking off, when the aircraft taxiing on the runway prior to accelerating for takeoff, is accelerating on the runway, or when the aircraft has just taken off, such that the aircraft is still aligned with the runway.

Processor 28 may determine whether the aircraft providing the state information is landing or taking off based on a change in speed of the aircraft indicated by the state information. The velocity of the aircraft can be included in the state information or processor 28 may derive the velocity based on position data included in the state information. A constant altitude and heading with a deceleration of speed may indicate the aircraft is landing. Acceleration of the aircraft at a constant altitude and heading may indicate the aircraft is taking off.

In some examples, the aircraft state information indicates whether the aircraft is ascending or descending, as well as the present altitude of aircraft. Thus, in some examples, processor 28 determines aircraft 12 is landing in response to determining the aircraft state information indicates aircraft 12 is descending and the altitude of aircraft 12 is below a predetermined altitude. The predetermined altitude may be selected to be an altitude at which an aircraft should be or is expected to be lined up with a runway e.g., aircraft 12 is lined up with an extended centerline of the runway), such that the coordinates of the aircraft may indicate the location of the runway. For example, according to some standards, an aircraft should be lined up with the runway, but not over the runway, by about 500 feet (about 150 meters) above field elevation. Thus, in some examples, the predetermined altitude is 500 feet. As another example, the predetermined altitude may be selected to be an altitude at which an aircraft is over a runway. According to some standards, an aircraft is over a runway when the aircraft is about 30 feet (about 10 meters) in the air. The predetermined altitude may be different in other examples.

In addition to, or instead of the aforementioned techniques, processor 28 may determine aircraft 12 is landing in response to determining aircraft 12 is on the ground and is moving at a speed at or below predetermined speed threshold. The predetermined speed threshold can be selected to be a maximum speed at which aircraft 12 is expected to be moving after touching down on the ground. If processor 28 is onboard aircraft 12, processor 28 may determine aircraft 12 is on the ground based on the weight on the wheels of the aircraft measured by one or more data sources 16, based on a squat switch, which indicates when aircraft 12 is on the ground, or any combination thereof. In addition, the aircraft state information provided by aircraft 12 may indicate whether aircraft 12 is on the ground.

Processor 28 may determine aircraft 12 is taking off in response to determining the aircraft state information indicates the aircraft is ascending and the altitude of aircraft 12 is below a predetermined altitude (e.g., about 500 feet). In this case, the altitude may be selected to be the altitude at which aircraft 12 is still lined up with the runway after becoming airborne. The predetermined altitude values discussed herein may be stored by memory 30 or another memory.

In addition to, or instead of the aforementioned techniques, processor 28 may determine aircraft 12 is taking off in response to determining aircraft 12 is on the ground and is moving at a speed at or above a predetermined speed threshold. The predetermined speed threshold can be selected to be a minimum speed at which aircraft 12 is moving after beginning the acceleration down the runway and prior to becoming airborne, e.g., about 40 knots.

In response to determining aircraft 12 is not landing or taking off ("NO" branch of block 42), processor 28 may continue to monitor received aircraft state information until the received information indicates aircraft 12 is landing or taking off. In response to determining aircraft 12 is landing or taking off ("YES" branch of block 42), processor 28 determines the coordinates of one or more points of a runway based on the received aircraft state information (44). For example, processor 28 may determine the coordinates of aircraft 12 indicated by the state information to be one point of the runway or may derive the coordinates of one or more points of the runway based on the coordinates of aircraft 12 indicated by the state information.

In some examples, processor 28 determines the coordinates of one or more points of a runway by determining the coordinates of aircraft 12 during a takeoff phase of aircraft 12. For example, processor 28 may determine when aircraft 12 was taxiing (e.g., based on a speed of aircraft 12) and when aircraft 12 took off from a runway, and then filter the coordinates of aircraft 12 between taxiing and takeoff to determine the coordinates during the takeoff phase. In some examples, processor 28 determines aircraft 12 is taxiing in response to determining a speed of aircraft 12 is below 40 knots, unless a subsequent takeoff is in the same direction. The takeoff phase of aircraft 12 can be the period of time prior to becoming airborne during which aircraft 12 was accelerating. Processor 28 can determine when aircraft 12 is airborne using any suitable technique, such as using one or more internal data sources 16 if processor 28 is onboard aircraft 12, or based on a speed of aircraft 12 indicated by aircraft state information. A speed above a certain speed threshold, such as above 80 knots, may indicate aircraft 12 is airborne.

Similarly, processor 28 can determine the coordinates of one or more points of a runway by determining the coordinates of aircraft 12 during a landing phase of aircraft 12. For example, processor 28 may determine when aircraft 12 touched down on a runway, when aircraft 12 was taxiing after landing, and then filter the coordinates of aircraft 12 between touch down and taxiing to determine the coordinates of aircraft 12 during the landing phase. The landing phase of aircraft 12 can be the period of time from touch down during which aircraft 12 was decelerating to a taxiing speed.

Processor 28 determines and/or updates a runway location based on the determined coordinates for one or more points of the runway (46) and, in some examples, based on a set of previously determined coordinates for other points of the runway. For example, processor 28 may use extrapolation techniques, interpolation techniques or other estimation techniques to determine a reasonably accurate location of the runway based on one or more runway location data points. As an example, processor 28 may determine that the runway extends between two of the determined points, extends out a certain distance from one of the determined end points, or both. Due to the relatively small distances involved, e.g., the relatively small airport size versus earth size, linear interpolation and linear extrapolation may be used without introducing significant error in the runway location determination.

Processor 28 can store the determined runway location in memory 30 as runway information 32 (48). In addition, in some examples, processor 28 transmits, via communication module 26, the determined coordinates, the determined runway location, or both, to another device, such as aircraft 12 (if processor 28 is not onboard aircraft 12), one or more other aircraft 13 or a central database that may be accessed by multiple aircraft.

In some examples, processor 28 stores a determined runway location as a plurality of coordinates, each of the coordinates being associated with a respective location point of the runway. In one example, the location points indicated by the coordinates can include points at (estimated) first and second ends of the runway and along an approximated centerline of the runway, which extends between the first and second ends. Processor 28 can supplement a stored coordinate set to include coordinates determined based on aircraft state information from aircraft 12 (e.g., provided during subsequent uses of the runway by aircraft 12) or based on aircraft state information from one or more other aircraft 13 using the runway.

Processor 28 may associate newly determined coordinates with a stored coordinate set, for example, the newly determined coordinates are within a predetermined distance of at least one coordinate of the stored set, if the newly determined coordinates are within a boundary defined based on the coordinates of the stored set, if the coordinates are within a predetermined lateral distance of a previously approximated runway centerline associated with the stored set, or any combination thereof. The boundary may represent, for example, an outline of a runway. Adding a newly determined coordinate to an existing set may be useful for increasing the confidence in the runway location determination.

If a newly determined coordinate is not within a predetermined distance of a coordinate of an existing set, within a lateral distance of a determined (approximate) centerline of a runway, or within the boundary associated with the set, then processor 28 may determine the determined coordinate is a point of a different runway and may create a new coordinate set that includes the determined coordinate.

In some examples, processor 28 generates a runway with a metric that indicates the quality of the runway determination and associates the metric with the runway and coordinate set in memory 30. The metric can be, for example, based on the number of coordinates in the set of coordinates associated with the runway. As an example, the metric can be the number of coordinates in the set of coordinates, or a number on a predetermined scale, the scale including of numbers each associated with a respective "bucket" of a number of coordinates.

Figure 3:
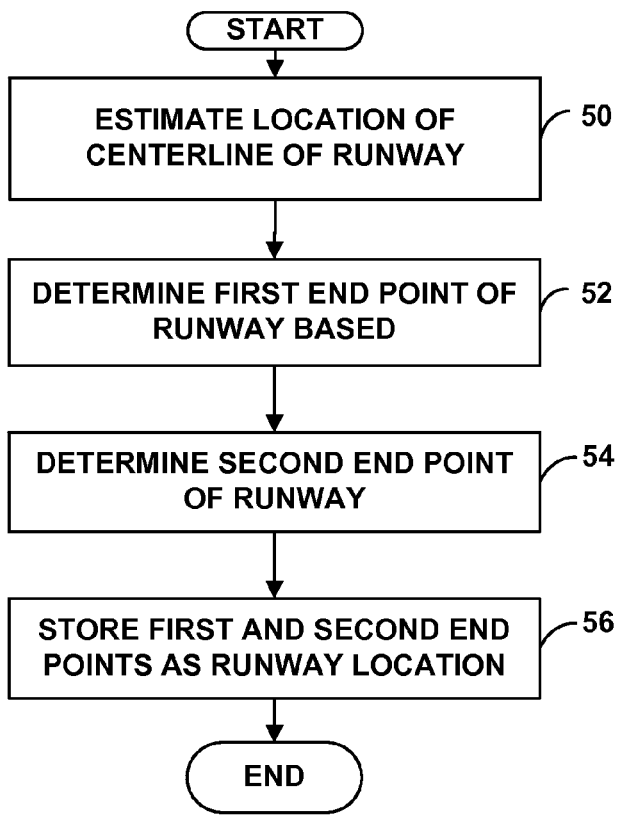
FIG. 3 is a flow diagram of an example technique for determining a location of a centerline of a runway and estimated locations of the first and second ends of the runway based on aircraft state information from at least one aircraft.

FIG. 3 is a flow diagram of an example technique that processor 28 may implement to approximate a location of a centerline of the runway and the estimated locations of the first and second ends of the runway based on aircraft state information from aircraft 12. FIG. 3 is described with reference to FIG. 4, which is a conceptual diagram of a runway, illustrating points of the runway determined based on aircraft state information from aircraft 12.

Figure 4:
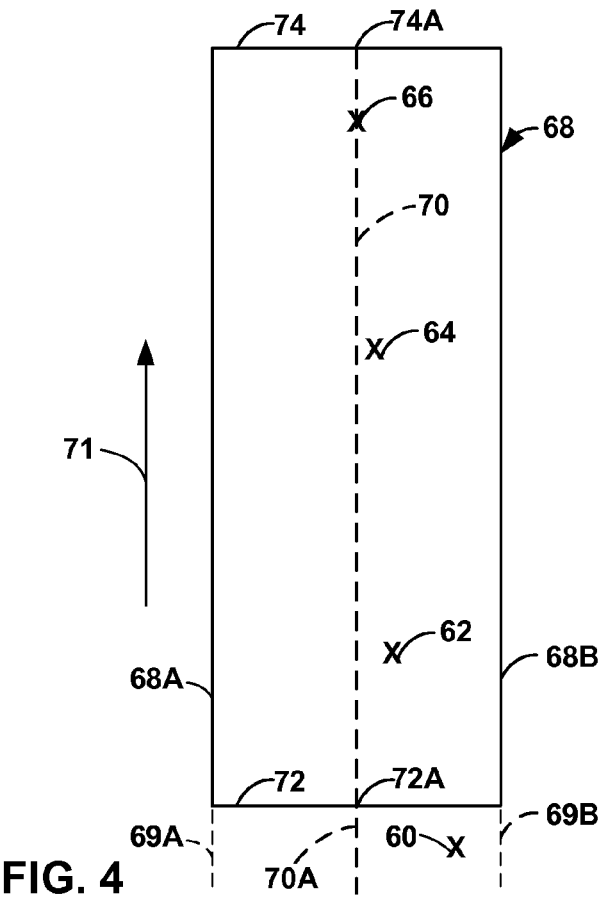
FIG. 4 is a conceptual diagram of a runway and illustrates different determined points of the runway and a centerline of the runway.

As described with respect to FIG. 2, processor 28 may receive, over time, aircraft state information from aircraft 12. When aircraft 12 is landing on runway 68 in direction indicated by arrow 71, the state information may indicate coordinates 60, 62, 64, and 66 of aircraft 12. Coordinates 60, 62, 64, 66 can be, for example, geographic coordinates of a global coordinate system or relative coordinates defined with respect to a common reference position. Coordinates 60 correspond to the position of aircraft 12 prior to touchdown on runway 68, when aircraft 12 is airborne and lined-up with runway 68. As shown in FIG. 4, when aircraft 12 is lined-up with runway 68, aircraft 12 is within side bounds 69A, 69B of runway 68 and can be aligned with an extended centerline 70A. Side bounds 69A, 69B are defined by the sides 68A, 68B of runway 68 and extend substantially parallel (e.g., parallel or nearly parallel) to each other and to centerline 70.

Coordinates 62 may be the first reported position of aircraft 12 on the ground, immediately after touchdown. Coordinates 64 may be a position of aircraft 12 as aircraft 12 traverses down runway 68 and decelerates. Coordinates 66 may be a position of aircraft 12 when aircraft 12 turns off runway 68, e.g., onto a taxiway of the airport. Processor 28 can also receive these types of coordinates 60, 62, 64, 66 from other aircraft using runway 68.

In accordance with the technique shown in FIG. 3, processor 28 approximates the location of centerline 70 of runway 68 (50). Centerline 70 represents a substantially straight line that extends the length of runway 68, from first end 72 to second end 74, where centerline 70 may be equidistant from sides 68A, 68B of runway 68. In some cases, aircraft 12 may be substantially aligned with centerline 70 upon touchdown on runway 68, and/or the pilot may navigate aircraft 12 to be on or near centerline 70 as aircraft 12 approaches end 74 of runway 68 after landing. Thus, in some examples, processor 28 determines that point 66 at which aircraft 12 turned off runway 68 is a point that is approximately along centerline 70. Processor 68 may then approximate a location of centerline 70 based on turnoff point 66 of aircraft 12 and additional turnoff point information provided by other aircraft using runway 68. Processor 28 may, for example, fit a line to the turnoff points using linear regression to determine the approximate location of centerline 70 (with the line extending in a direction parallel to the direction 71 in which aircraft 12).

Processor 28 determines the location of a first end point 72A of runway 68 based on the received aircraft state information (52). In one example, processor 28 determines that coordinates 62 of aircraft 12 immediately after touch down (as indicated by aircraft state information) correspond to first end 72 of runway 70. Coordinates 62 can be, for example, the first position information received by processor 28 from aircraft 12 while aircraft 12 is on the ground after landing. In other examples, because an aircraft typically does not land at the very end of a runway, processor 28 may extrapolate first end point 72A from coordinates 62. As an example, processor 28 may estimate that, based on stored landing standards, aircraft 12 landed approximately 1000 feet (about 300 meters) from the true end of runway 68. Processor 28 may then approximate the location of first end 72 by determining a point approximately 1000 feet from coordinates 62 (measured along a substantially straight line in direction 71), and determine point 72A is aligned with the determined point (in a direction perpendicular to the approximated centerline) and along the approximated centerline.

In other examples, processor 28 can use other parameters for extrapolating the coordinates for the location of first end point 72A of runway 68 based on the touchdown location of aircraft 12. For example, because first end 72 of runway 68 may sit between the points indicated by coordinates 60 and coordinates 62, processor 28 may determine first end point 72A by interpolating a point along the approximated centerline between the points indicated by coordinates 60 and coordinates 62. As an example, processor 28 may determine first end point 72A to be midway, along the approximated centerline, between the points indicated by coordinates 60 and coordinates 62. In some cases, processor 28 may take the altitude of each point, change in attitude of aircraft 12 between points, and the speed of aircraft 12 at each point into consideration to estimate first end point 72A based on coordinates 60 and coordinates 62.

Processor 28 also determines a second end point 74A of runway 68 based on the received aircraft state information (54), where second end point 74A may be a point along second end 74 that is at an opposite end of centerline 70 than first end point 72A. In one example, processor 28 determines coordinates 66 of aircraft 12 when aircraft 12 turned off runway 68. Processor 28 may determine when aircraft 12 turned off runway 68 by detecting a change in a heading of aircraft 12 based on aircraft state information provided by aircraft 12 or based on other information provided by data sources 16. Because runways are typically substantially straight, the point at which aircraft 12 changed heading may indicate the point at which aircraft 12 turned off runway 68. In some examples, processor 28 may determine coordinates 66 are along second end 74 point of runway 68, and, therefore, estimate second end point 74A to be a point along the approximated centerline and aligned with point 66. However, because aircraft seldom exit the runway at the very end, in some examples, processor 28 may estimate the location of second end point 74A by extrapolating a point along the approximated centerline from coordinates 66, as well as other coordinates in the same set as coordinates 66.

In another example, processor 28 may determine coordinates for second end point 74A by determining the point along the approximated centerline that is a determined nominal length of runway 68 away from determined first end point 72A. Processor 28 may determine a nominal length of a runway required for a landing of aircraft 12 based on the type of aircraft 12 (as indicated by aircraft state information) and information stored by memory 30 that associates aircraft types with nominal runway lengths, i.e., a length of runway required for the particular aircraft 12 to land. The type of aircraft can be, for example, based on a weight of the aircraft. In some examples, memory 30 may store information that associates relatively light aircraft with a first minimum runway length (e.g., about 3000 feet (about 900 meters)) and associates relatively heavy aircraft with a second minimum runway length (e.g., about 8000 feet (about 2400 meters)). These are merely example runway lengths and other runway lengths can be used in other examples.

Processor 28 can determine the type of aircraft 12 based on aircraft state information transmitted by aircraft 12, or, if processor 28 is onboard aircraft 12, based on information stored by memory 22. Processor 28 may approximate a location of the second end 74 of runway 68 to be the point 74A along centerline 70 that is the nominal runway length away from first end point 72A.

In yet another example, processor 28 may determine coordinates for second end point 74A based on turnoff point 66 and a turnoff vector of aircraft 12. The turnoff vector may indicate the speed and heading change rate of aircraft 12 as aircraft 12 turned to exit runway 68. In some cases, the turnoff vector indicates whether the turnoff occurred at a relatively high speed, a relatively low speed, or a normal speed between the high and low speeds. Memory 30 may store speed thresholds for determining whether the turnoff occurred at a relatively high speed, a relatively low speed, or a normal speed.

Turnoffs occurring at the end of a runway may be at a relatively low speed and at a relatively sharp turn rate. Thus, in some examples, in response to determining the turnoff vector indicates aircraft 12 turned off runway 68 at a relatively low speed and at a relatively sharp turn rate (e.g., near or at 90 degrees relative to the approximated centerline), processor 28 may determine that point 66 is at an end 74 of runway 68 and determine second point 74A to be a point along the end 74 and along the approximated centerline.

In other examples of the technique shown in FIG. 3, processor 28 may determine a second end point 74A of runway 68, e.g., using the techniques described above, and determine first end point 72A (52) based a determined nominal length of runway 68 or a stored runway length. Processor 28 may approximate a location of the first end point 72A of runway 68 as the point along the approximated centerline that is the nominal runway length or stored runway length away from second end point 74A.

Processor 28 stores the determined first and second end points 72A, 74A as the runway location in memory 30 (56). In some examples, processor 28 also determines the footprint of runway 68 based on a predetermined runway width (the distance between sides 68A, 68B measured in a direction substantially perpendicular to centerline 70), which may be stored by memory 30. For example, processor 28 may estimate that that runway 68 has the predetermined runway width, which is centered along the approximated centerline. In this way, processor 28 may better approximate the location of runway 68. The determined footprint of runway 68 may also be used to define a boundary for determining whether a determined coordinate belongs to a coordinate set associated with runway 68.

In some cases, processor 28 implements the techniques shown in FIGS. 2 and 3 to determine multiple points of a runway based on aircraft state information from a plurality of aircraft, rather than just aircraft 12 as primarily described herein. Processor 28 can iteratively implement the technique shown in FIG. 3 based on additional data sets (e.g., from other aircraft landing or taking off) to improve the coordinate set associated with runway 68.

For example, after determining ends points 72A, 74A and a location of centerline 70 of runway 68 based on position information transmitted by aircraft 12 while landing on runway 68, processor 28 can implement the technique shown in FIG. 3 to determine first and second end points based on position information transmitted by another aircraft 13 landing on or taking off from runway 68 at a different time than when aircraft 12 used the runway. If, for example, processor 28 determines that a second end point determined based on the position information transmitted by the other aircraft 13 is located further from first end point 72A than the previously determined second end point 74A (as measured in direction 71), processor 28 may update the runway location information for runway 68 stored by memory 30 to replace end point 74A with the more recently determined end point. This is one way in which the runway location by memory 30 can be updated over time based on position information from other aircraft.

Example coordinates that processor 28 may use to determine location of runway 68 when aircraft 12 is taking off can include, for example, the coordinates of aircraft 12 prior to beginning an acceleration run on runway 68, the coordinates of aircraft 12 at liftoff, and the first coordinates after aircraft 12 is airborne. Assuming aircraft 12 is taking off in direction 71, processor 28 can approximate the location of centerline 70 as being a line that extends in a direction substantially parallel to the present heading of aircraft 12 and through the point defined by the coordinates of aircraft 12 prior to beginning an acceleration run. As another example, processor 28 can approximate that centerline 70 extends in a direction substantially parallel to the present heading of aircraft 12 and through the liftoff point. If processor 28 approximates the location of centerline 70 based on a plurality of liftoff points from a plurality of aircraft using runway 68, processor 28 can fit a line to the liftoff points to approximate the location of centerline 70.

In addition, processor 28 can extrapolate first end point 72A of runway 68 based on the coordinates of aircraft 12 prior to beginning an acceleration run. While aircraft 12 may not begin a takeoff phase from the very end 72 of runway 68, the point at which aircraft 12 begins the acceleration run may be a good approximate for the end 72.

Processor 28 can also determine the location of second end 74 of runway 68 to be at, for example, coordinates of aircraft 12 at liftoff, or to be midway between the points indicated by the coordinates of aircraft 12 at liftoff and the first coordinates transmit by aircraft 12 while aircraft 12 is airborne. In other examples, processor 28 can determine the location of second end 74 of runway 68 by extrapolating the second end point 74A from the determined first end point 72A based on a nominal length of runway 68 required for takeoff by aircraft 12 (as indicated by the aircraft type and based on nominal runway length information stored by memory 30) or based on a stored runway length, processor 28 can determine the location of first end 72 of runway 68 by extrapolating the first end point 72A from a determined second end point 74A based on a nominal length of runway 68 required for takeoff by aircraft 12 or based on a stored runway length. Other interpolation or extrapolation techniques may also be used.

The techniques described with respect to FIGS. 2 and 3 may be used to develop a reasonably accurate location for the active runways. While the techniques may not be used to detect all runways, such as inactive runways, the technique may be used to detect active runways, which pose a bigger risk for potential collision on a runway than the inactive runways. As the volume of traffic on a particular runway increases, the potential for collisions on the runway may also increase. Additionally, the accuracy of the runway location determination may also increase as more aircraft 12 use the runway and transmit position information that can be associated with the runway.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

As mentioned above, the techniques of this disclosure may also be implemented on an article of manufacture comprising a computer-readable storage medium. The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the devices described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A method comprising:
   receiving, by a processor, aircraft state information from at least one aircraft, the aircraft state information including position information for the at least one aircraft;
   determining, by the processor and based on the aircraft state information, the at least one aircraft is landing or taking off;
   determining, by the processor, the position information for the at least one aircraft during the landing or take off of the respective aircraft;
   determining, by the processor, a location of a runway based on the received aircraft state information, wherein determining the location of the runway comprises deriving coordinates of one or more points of the runway based on the position information for the at least one aircraft during the landing or take off of the respective aircraft; and
   after determining the location of the runway, storing the determined location of the runway in a memory.

2. The method of claim 1, wherein the position information comprises at least one of geographic coordinates or relative coordinates of the at least one aircraft.

3. The method of claim 1, wherein deriving the coordinates of one or more points of the runway comprises determining coordinates of one or more points along an approximated centerline of the runway.

4. The method of claim 3, further comprising determining the approximated centerline of the runway, wherein determining the approximated centerline of the runway comprises:
   determining, based on the received aircraft state information, a turnoff point of the at least one aircraft from the runway; and
   determining the approximated centerline extends substantially parallel to a heading of the at least one aircraft during a landing of the at least one aircraft on the runway and up to the turnoff point.

5. The method of claim 3, wherein the at least one aircraft comprises a plurality of aircraft, the method further comprising determining the approximated centerline of the runway, wherein determining the approximated centerline of the runway comprises:
   determining, based on the received aircraft state information, turnoff points of the plurality of aircraft from the runway; and fitting a line to the turnoff points using linear regression, wherein the line is the approximated centerline of the runway.

6. The method of claim 3, further comprising determining the approximated centerline of the runway, wherein determining the approximated centerline of the runway comprises:
   determining, based on the received aircraft state information, a liftoff point of the at least one aircraft from the runway; and
   determining the centerline extends substantially parallel to a heading of the at least one aircraft during a takeoff of the at least one aircraft on the runway and to the liftoff point.

7. The method of claim 3, wherein the at least one aircraft comprises a plurality of aircraft, the method further comprising determining the approximated centerline of the runway, wherein determining the location of the approximated centerline of the runway comprises:
   determining, based on the received aircraft state information, liftoff points of the plurality of aircraft from the runway; and
   fitting a line to the liftoff points using linear regression, wherein the line is the approximated centerline of the runway.

8. The method of claim 3, wherein determining coordinates of one or more points along an approximated centerline of the runway comprises:
   determining coordinates of a first point near a first end of the runway and along the approximated centerline; and
   determining coordinates of a second point near a second end of the runway and along the approximated centerline, wherein the runway extends between the first end and the second end.

9. The method of claim 8, wherein determining the coordinates of the first point comprises determining, based on the aircraft state information, coordinates of the at least one aircraft immediately after touchdown on the runway, the coordinates defining a third point near the first end of the runway, wherein the first point is aligned with the third point.

10. The method of claim 8, wherein determining the coordinates of the first point comprises:
    determining, based on the aircraft state information, coordinates of the at least one aircraft immediately after touchdown on the runway, the coordinates defining a third point; and
    extrapolating, from the third point, a fourth point near the first end of the runway, wherein the first point is aligned with the fourth point.

11. The method of claim 8, wherein determining the coordinates of the first point comprises:
    determining, based on the aircraft state information, first coordinates of the at least one aircraft immediately prior to touchdown on the runway, the first coordinates defining a third point;
    determining, based on the aircraft state information, second coordinates of the at least one aircraft immediately after touchdown on the runway, the second coordinates defining a fourth point; and
    interpolating the first point between third and fourth points.

12. The method of claim 8, wherein determining the coordinates of the second point comprises determining, based on the received aircraft state information, a turnoff point of the at least one aircraft from the runway, wherein the second point is aligned with the turnoff point.

13. The method of claim 8, wherein determining the coordinates of the second point comprises:
    determining, based on the received aircraft state information, a turnoff point of the at least one aircraft from the runway; and
    extrapolating, from the turnoff point, a third point near the second end of the runway, wherein the second point is aligned with the third point.

14. The method of claim 8, wherein determining the coordinates of the second point comprises:
    determining, based on the received aircraft state information, a turnoff point of the at least one aircraft from the runway;
    determining, based on the received aircraft state information, a turnoff vector of the at least one aircraft from the runway; and
    in response to determining the turnoff vector indicates the speed of the at least one aircraft was below a predetermined speed, determining the second point is aligned with the turnoff point.

15. The method of claim 8, wherein determining the coordinates of the first point comprises determining, based on the aircraft state information, coordinates of the at least one aircraft at a beginning of an acceleration run on the runway, the coordinates defining a third point near the first end of the runway, wherein the first point is aligned with the third point.

16. The method of claim 8, wherein determining the coordinates of the first point comprises:
    determining, based on the aircraft state information, coordinates of the at least one aircraft at a beginning of an acceleration run on the runway, the coordinates defining a third point; and
    extrapolating, from the third point, a fourth point near along the first end of the runway, wherein the first point is aligned with the fourth point.

17. The method of claim 8, wherein determining the coordinates of the second point comprises determining, based on the aircraft state information, coordinates of the at least one aircraft at liftoff from the runway, the coordinates defining a third point near the second end of the runway, wherein the second point is aligned with the third point.

18. The method of claim 8, wherein determining the coordinates of the second point comprises:
    determining, based on the aircraft state information, coordinates of the at least one aircraft at liftoff from the runway; and
    extrapolating, from the coordinates of the at least one aircraft at liftoff, a third point near the second end of the runway, wherein the second point is aligned with the third point.

19. The method of claim 8, wherein determining the coordinates of the second point comprises:
    determining, based on the aircraft state information, first coordinates of the at least one aircraft at liftoff from the runway, the first coordinates defining a third point;
    determining, based on the aircraft state information, second coordinates of the at least one aircraft immediately after liftoff from the runway, the second coordinates defining a fourth point; and
    interpolating the second point between the third and fourth points.

20. The method of claim 8, wherein determining the coordinates of the second point comprises:
    determining, based on the aircraft state information, a type of the at least one aircraft;
    determining a nominal length of the runway based on the type of the at least one aircraft; and determining the second point is along the approximated centerline the nominal length of the runway away from the first point.

21. The method of claim 1, wherein the processor is onboard a first aircraft and receiving the aircraft state information from the at least one aircraft comprises receiving the aircraft state information from at least one aircraft other than the first aircraft.

22. The method of claim 1, wherein the processor is onboard a first aircraft and receiving the aircraft state information from the at least one aircraft comprises receiving the aircraft state information from at least the first aircraft.

23. The method of claim 1, wherein the processor is external to the at least one aircraft.

24. The method of claim 1, wherein the position information for the at least one aircraft during the landing or take off comprises position information for the at least one aircraft during use of the runway by the at least one aircraft.

25. A system comprising:
a memory; and
a processor configured to:
receive aircraft state information from at least one aircraft, the aircraft state information including position information for the at least one aircraft,
determine, based on the aircraft state information, the at least one aircraft is landing or taking off,
determine the position information for the at least one aircraft during the landing or take off of the respective aircraft,
determine a location of a runway based on the received aircraft position information by at least deriving coordinates of one or more points of the runway based on the position information for the at least one aircraft during the landing or take off of the respective aircraft, and
after determining the location of the runway, store the determined location in the memory.

26. The system of claim 25, wherein the processor is onboard an aircraft and is configured to receive the aircraft state information from the aircraft.

27. The system of claim 25, wherein the processor is onboard an aircraft and is configured to receive the aircraft state information from at least one different aircraft.

28. The system of claim 25, wherein the processor is external to an aircraft.

29. The system of claim 25, wherein the position information comprises at least one of geographic coordinates or relative coordinates of the at least one aircraft.

30. The system of claim 25, wherein the processor is configured to derive the coordinates of one or more points of the runway by at least determining coordinates of one or more points along an approximated centerline of the runway.

31. The system of claim 30, wherein the processor is configured to determine the approximated centerline of the runway by at least:
determining, based on the received aircraft state information, a turnoff point of the at least one aircraft from the runway; and
determining the approximated centerline extends substantially parallel to a heading of the at least one aircraft during a landing of the at least one aircraft on the runway and up to the turnoff point.

32. The system of claim 30, wherein the at least one aircraft comprises a plurality of aircraft, and wherein the processor is configured to determine the approximated centerline of the runway by at least:
determining, based on the received aircraft state information, turnoff points of the plurality of aircraft from the runway; and
fitting a line to the turnoff points using linear regression, wherein the line is the approximated centerline of the runway.

33. The system of claim 30, wherein the processor is configured to determine the approximated centerline of the runway by at least:
determining, based on the received aircraft state information, a liftoff point of the at least one aircraft from the runway; and
determining the centerline extends substantially parallel to a heading of the at least one aircraft during a takeoff of the at least one aircraft on the runway and to the liftoff point.

34. The system of claim 30, wherein the at least one aircraft comprises a plurality of aircraft, and wherein the processor is configured to determine the approximated centerline of the runway by at least:
determining, based on the received aircraft state information, liftoff points of the plurality of aircraft from the runway; and
fitting a line to the liftoff points using linear regression, wherein the line is the approximated centerline of the runway.

35. The system of claim 30, wherein the processor is configured to determine the coordinates of one or more points along an approximated centerline of the runway by at least:
determining coordinates of a first point near a first end of the runway and along the approximated centerline; and
determining coordinates of a second point near a second end of the runway and along the approximated centerline, wherein the runway extends between the first end and the second end.

36. The system of claim 35, wherein the processor is configured to determine the coordinates of the first point by at least determining, based on the aircraft state information, coordinates of the at least one aircraft immediately after touchdown on the runway, the coordinates defining a third point near the first end of the runway, wherein the first point is aligned with the third point.

37. The system of claim 35, wherein the processor is configured to determine the coordinates of the first point by at least:
determining, based on the aircraft state information, coordinates of the at least one aircraft immediately after touchdown on the runway, the coordinates defining a third point; and
extrapolating, from the third point, a fourth point near the first end of the runway, wherein the first point is aligned with the fourth point.

38. The system of claim 35, wherein the processor is configured to determine the coordinates of the first point by at least:
determining, based on the aircraft state information, first coordinates of the at least one aircraft immediately prior to touchdown on the runway, the first coordinates defining a third point;
determining, based on the aircraft state information, second coordinates of the at least one aircraft immediately after touchdown on the runway, the second coordinates defining a fourth point; and
interpolating the first point between third and fourth points.

39. The system of claim 35, wherein the processor is configured to determine the coordinates of the second point by at least determining, based on the received aircraft state information, a turnoff point of the at least one aircraft from the runway, wherein the second point is aligned with the turnoff point.

40. The system of claim 35, wherein the processor is configured to determine the coordinates of the second point by at least:
   determining, based on the received aircraft state information, a turnoff point of the at least one aircraft from the runway; and
   extrapolating, from the turnoff point, a third point near the second end of the runway, wherein the second point is aligned with the third point.

41. The system of claim 35, wherein the processor is configured to determine the coordinates of the second point by at least:
   determining, based on the received aircraft state information, a turnoff point of the at least one aircraft from the runway;
   determining, based on the received aircraft state information, a turnoff vector of the at least one aircraft from the runway; and
   in response to determining the turnoff vector indicates the speed of the at least one aircraft was below a predetermined speed, determining the second point is aligned with the turnoff point.

42. The system of claim 35, wherein the processor is configured to determine the coordinates of the first point by at least determining, based on the aircraft state information, coordinates of the at least one aircraft at a beginning of an acceleration run on the runway, the coordinates defining a third point near the first end of the runway, wherein the first point is aligned with the third point.

43. The system of claim 35, wherein the processor is configured to determine the coordinates of the first point by at least:
   determining, based on the aircraft state information, coordinates of the at least one aircraft at a beginning of an acceleration run on the runway, the coordinates defining a third point; and
   extrapolating, from the third point, a fourth point near along the first end of the runway, wherein the first point is aligned with the fourth point.

44. The system of claim 35, wherein the processor is configured to determine the coordinates of the second point by at least determining, based on the aircraft state information, coordinates of the at least one aircraft at liftoff from the runway, the coordinates defining a third point near the second end of the runway, wherein the second point is aligned with the third point.

45. The system of claim 35, wherein the processor is configured to determine the coordinates of the second point by at least:
   determining, based on the aircraft state information, coordinates of the at least one aircraft at liftoff from the runway; and
   extrapolating, from the coordinates of the at least one aircraft at liftoff, a third point near the second end of the runway, wherein the second point is aligned with the third point.

46. The system of claim 35, wherein the processor is configured to determine the coordinates of the second point by at least:
   determining, based on the aircraft state information, first coordinates of the at least one aircraft at liftoff from the runway, the first coordinates defining a third point;
   determining, based on the aircraft state information, second coordinates of the at least one aircraft immediately after liftoff from the runway, the second coordinates defining a fourth point; and
   interpolating the second point between the third and fourth points.

47. The system of claim 35, wherein determining the coordinates of the second point comprises:
   determining, based on the aircraft state information, a type of the at least one aircraft;
   determining a nominal length of the runway based on the type of the at least one aircraft; and
   determining the second point is along the approximated centerline the nominal length of the runway away from the first point.

48. A system comprising:
   means for receiving aircraft state information from at least one aircraft, the aircraft state information including position information for the at least one aircraft;
   means for determining, based on the aircraft state information, the at least one aircraft is landing or taking off;
   means for determining the position information for the at least one aircraft during the landing or take off of the respective aircraft;
   means for determining a location of a runway based on the received aircraft state information, wherein the means for determining determines the location of the runway by at least deriving coordinates of one or more points of the runway based on the position information for the at least one aircraft during the landing or take off of the respective aircraft; and
   means for storing the determined location of the runway in a memory after the means for determining determines the location of the runway.

49. The system of claim 25, wherein the position information for the at least one aircraft during the landing or take off comprises position information for the at least one aircraft during use of the runway by the at least one aircraft.

* * * * *